United States Patent [19]

Ryder et al.

[11] Patent Number: 5,186,531
[45] Date of Patent: Feb. 16, 1993

[54] HEADLAMP ADJUSTER

[75] Inventors: Ronald L. Ryder, Roscoe; David C. Goss, Rockford, both of Ill.

[73] Assignee: Textron Inc., Providence, R.I.

[21] Appl. No.: 808,220

[22] Filed: Dec. 16, 1991

[51] Int. Cl.$^5$ .............................................. F21M 3/20
[52] U.S. Cl. ........................................ 362/66; 362/428
[58] Field of Search ...................... 362/61, 66, 69, 80, 362/287, 288, 418, 419, 428

[56] References Cited

U.S. PATENT DOCUMENTS

| | | | |
|---|---|---|---|
| 4,689,725 | 8/1987 | Saijo et al. | 362/428 |
| 4,707,771 | 11/1987 | Van Duyn et al. | 362/66 |
| 4,843,523 | 6/1989 | Nakamura | 362/69 |
| 4,939,945 | 7/1990 | Ryder et al. | 362/66 |
| 5,023,759 | 6/1991 | Eckenrode | 362/66 |
| 5,034,870 | 7/1991 | Weber | 263/66 |
| 5,077,642 | 12/1991 | Lisak | 362/80 |

FOREIGN PATENT DOCUMENTS 61-64548 4/1986 Japan ..................... 362/66

Primary Examiner—Richard R. Cole
Attorney, Agent, or Firm—Trexler, Bushnell, Giangiorgi & Blackstone, Ltd.

[57] ABSTRACT

A mechanism for adjusting the orientation of a vehicle headlamp includes a housing enclosing a gear movably coupled to an adjusting member such that rotation of the gear imparts linear movement to the adjusting member which controls the orientation of the headlamp. The housing also includes an internally projecting journal member which supports one end of the gear. The adjusting member extends through the journal member and projects from the housing. The housing can include first and second housing portions such that the first housing portion is secured between a pair of spaced walls projecting from the second housing portion and the adjusting member projects through the first housing portion and both of the spaced walls of the second housing portion. An additional feature includes a calibrating gauge or indicator to simplify resetting the correct translational position of the adjusting member which governs the proper vertical or horizontal alignment of the headlamp.

17 Claims, 3 Drawing Sheets

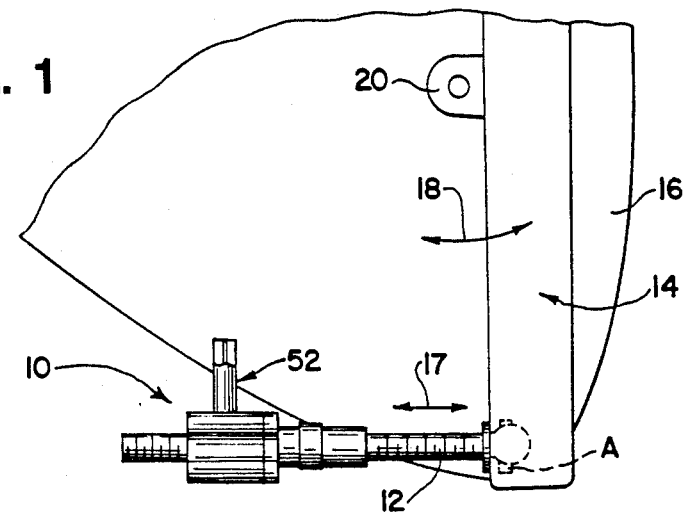
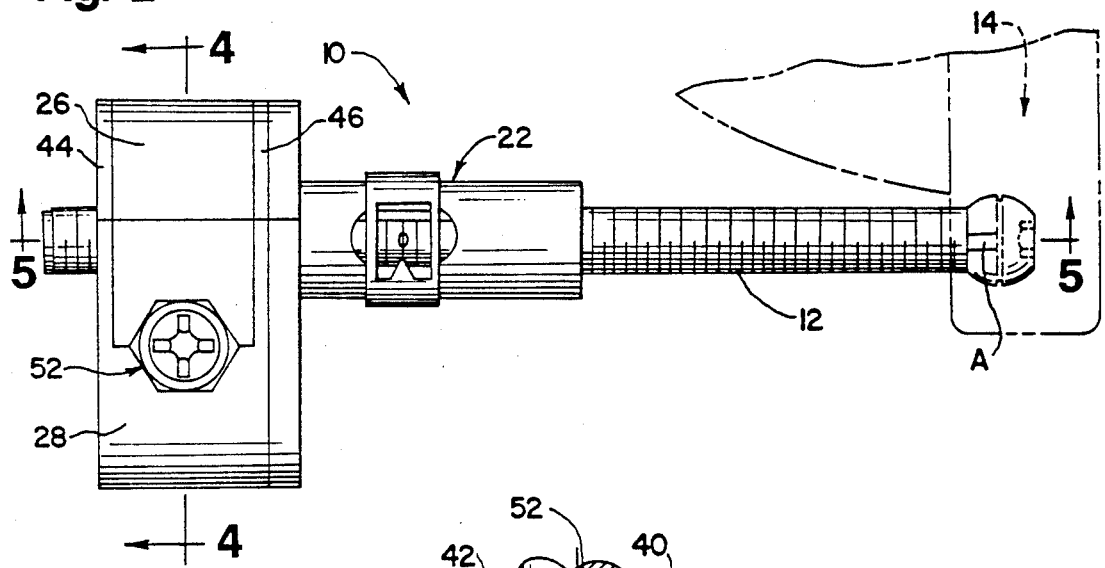
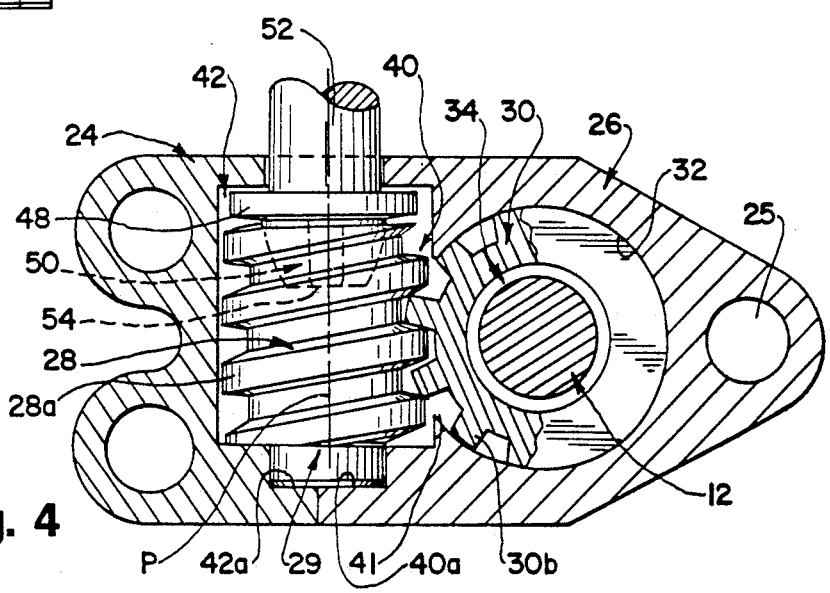

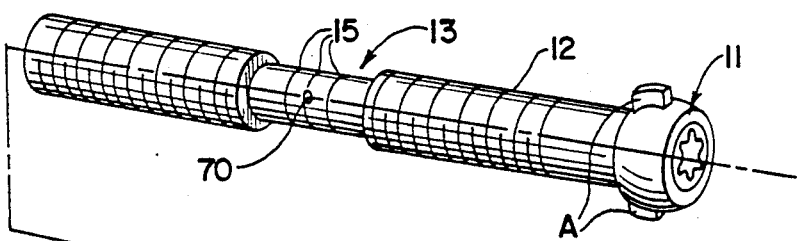
Fig. 3
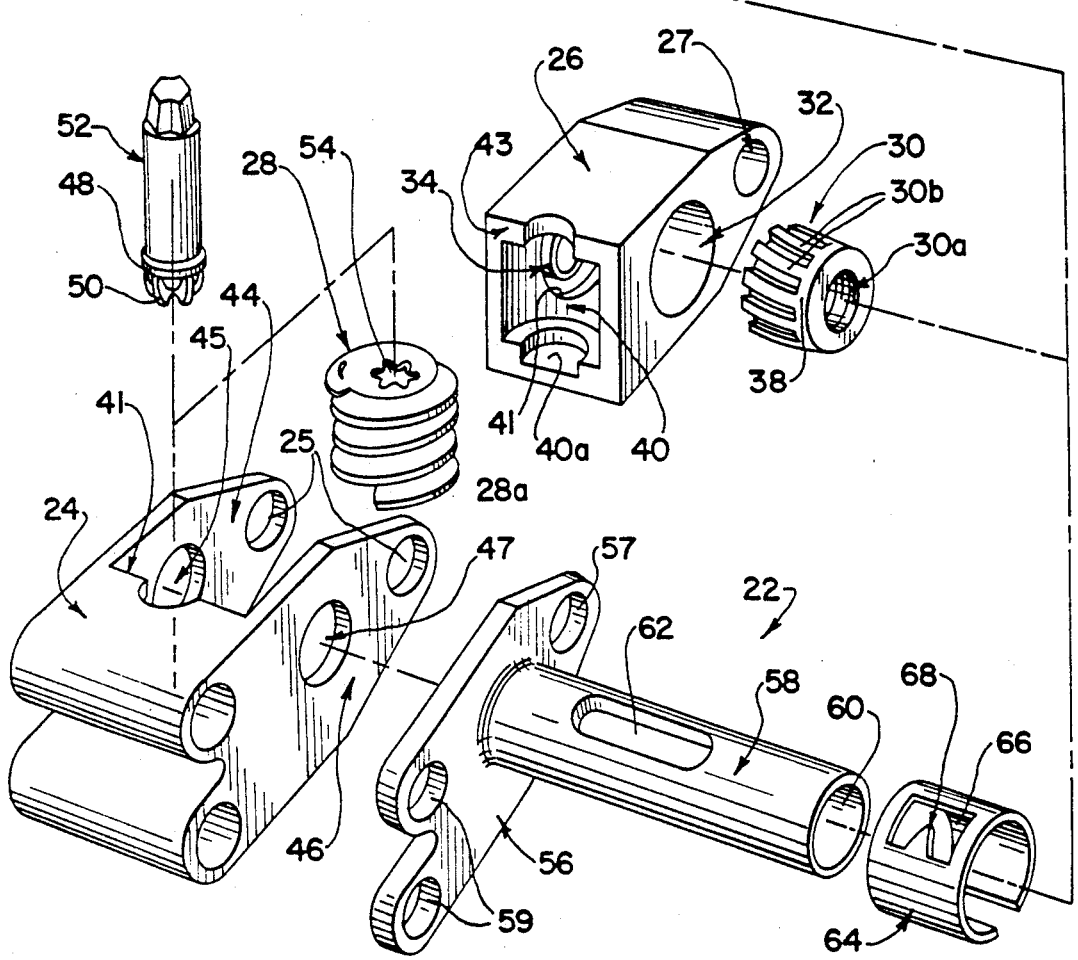
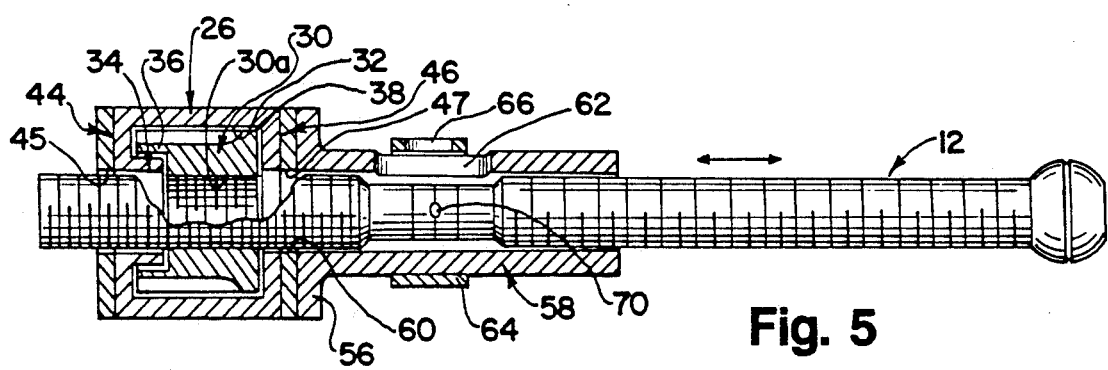
Fig. 5

HEADLAMP ADJUSTER

BACKGROUND OF THE INVENTION

The present invention relates to adjusting mechanism particularly for alignment of automobile headlamps, and more specifically relates to an improved assembly and construction of such mechanisms.

Successful modern adjusting mechanism for vehicle headlamps are described for example in U.S. Pat. Nos. 4,674,018, 4,689,725 and 4,893,219. In the described mechanisms, an adjusting screw is coupled to the headlamp housing and extends into a gear box or adjustment mechanism. The adjusting screw is operatively coupled to an adjusting drive shaft which is operated by conventional hand tools. Movement of the adjusting screw is attained by means of a pair of mitered gears and a threaded connection. One gear is coupled to and driven by a drive shaft, while the other gear is operatively associated with the adjusting screw which is held against rotation. As such, rotation of the drive shaft produces linear movement of the drive screw as is well known in the art.

The gear members and drive shaft can be assembled and sealed within the integral adjuster housing, while allowing the adjusting screw components to be assembled at a later time with a variety of screw lengths as required for different model automobiles. The adjusting screw is prevented from rotating so that its motion is limited to linear translation to pivot the headlamp housing to a desired orientation. Adjustment mechanisms in accordance with the present invention enable improved performance, construction and assembly of automobile headlamps.

SUMMARY OF THE INVENTION

In accordance with the present invention, a mechanism for adjusting the orientation of a vehicle headlamp includes a housing enclosing a gear movably coupled to an adjusting member such that rotation of the gear imparts linear movement to the adjusting member which controls the orientation of the headlamp. The housing also includes an internally projecting journal member which supports one end of the gear. The adjusting member extends through the journal member and projects from the housing.

In a preferred embodiment, the housing includes first and second housing portions such that the first housing portion is secured between a pair of spaced walls projecting from the second housing portion and the adjusting member projects through the first housing portion and both of the spaced walls of the second housing portion.

An additional feature of the preferred adjusting mechanism includes a calibrating gauge or indicator to simplify resetting the correct translational position of the adjusting member which governs the proper vertical or horizontal alignment of the headlamp. The gauge includes a tube through which the adjusting member extends and translates, and indicia are provided on the translating adjusting member to indicate the correct position thereof which is viewable through an aperture in the gauge tube. A calibrating ring with indicia thereon is mounted in movable fashion upon the gauge tube and is frictionally retained and set to record the correct position of the indicia on the adjusting member once the headlamp is adjusted at the factory. Should the headlamp be jarred or vibrated out of adjustment, a mechanic need only operate the adjusting mechanism to bring the indicia on the adjusting member back into registry with the mating indicia on the calibrated ring to attain the desired initial or pre-set position for the headlamp.

BRIEF DESCRIPTION OF THE DRAWINGS

FIG. 1 is a somewhat schematic, side elevational view of one embodiment of the adjusting mechanism according to the invention coupled to a headlamp for adjustment and alignment thereof;

FIG. 2 is a top plan view of the adjusting mechanism shown in FIG. 1;

FIG. 3 is an exploded perspective view of the adjusting mechanism shown in FIGS. 1 and 2;

FIG. 4 is a sectional view of the adjusting mechanism along a plane indicated by line 4—4 in FIG. 2;

FIG. 5 is a sectional view along a plane indicated by line 5—5 in FIG. 2;

DETAILED DESCRIPTION OF THE ILLUSTRATED EMBODIMENT

Figure 6:
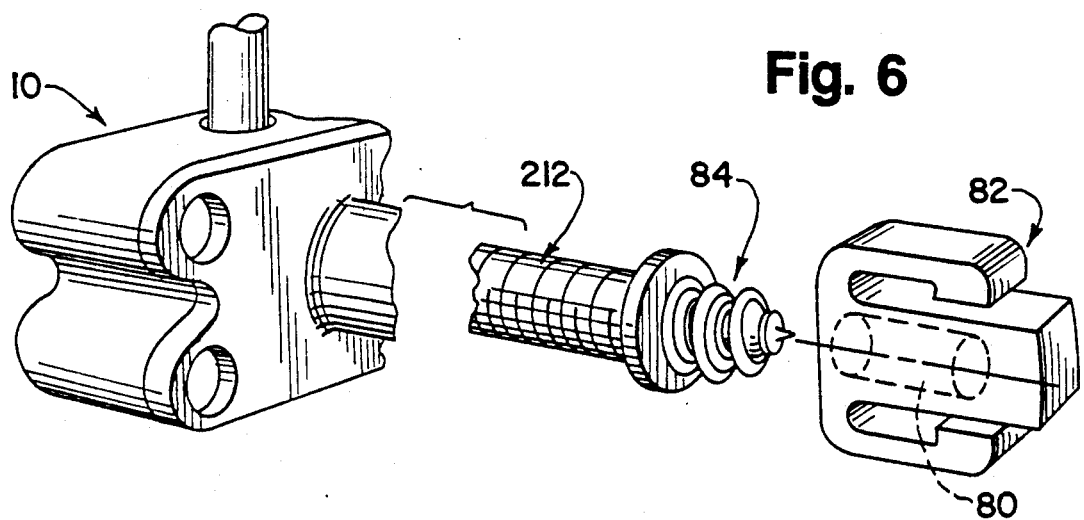
FIG. 6 is a perspective view of one embodiment of a coupling device for securing an adjusting mechanism as shown in FIG. 1.

Referring to FIGS. 1 and 2, an embodiment of the adjusting mechanism according to the invention, designated generally by reference character 10, includes an adjusting screw 12 which has its distal end secured to a headlamp housing 14 which holds the headlamp assembly designated generally 16. The adjusting screw 12 is fixed against rotation as further described hereinafter, and thus can only move linearly in response to rotation of the internal gearing within the mechanism 10, as indicated by arrow 17. The linear motion of the screw 12 by the mechanism 10 causes the headlamp housing 14 to pivot through an arc 18 about a pivot bearing 20 in order to adjust the vertical alignment of the headlamp 16 in the configuration shown in FIG. 1. In practice, an additional adjusting mechanism 10 is employed to obtain horizontal adjustment of headlamp. In order to simplify resetting the correct horizontal position of the vertical or horizontal alignment, a combination indicator and memory gauge assembly, generally designated by reference character 22 and more fully described hereinafter, may be included as part of the overall adjusting mechanism 10.

Referring now to FIGS. 3 and 4, the adjusting mechanism 10 includes two gear housing portions generally designated 24 and 26, respectively, which house a screw or worm drive gear 28 which drives an adjusting gear member in the form of a spur gear 30 as best shown in FIG. 4. The spur gear 30 is engaged with the drive gear 28 and the adjusting screw 12 as discussed hereinafter, and this gear 30 is referred to as the adjusting gear and has a central, internally threaded bore 30a in which the externally threaded adjusting screw 12 is engaged such that the screw 12 projects from both ends of the spur gear 30, and moves linearly relative to said gear 30.

Referring again to FIGS. 3-5, the adjusting gear 30 is journaled within a bore 32 in the housing portion 26. The housing portion 26 also has an internally projecting, annular flange 34 which forms a journal member extending into and supporting an unthreaded cylindrical recess 36 formed at the rear end of the gear 30 as best shown in FIG. 5. The diameter of the journaling flange 34 is slightly larger than that of the adjusting screw 12 which translates therethrough. The opposite end of the gear 30 has an unthreaded circumferential land 38 which is rotationally supported by the journaling cylindrical wall of the bore 32. The annular flange 34 additionally provides an axial thrust bearing for the gear 30 and together with the land 38 provides the adjusting gear 30 with particularly stable journaling alignment which prevents vibrational displacement of the gear 30.

The housing portion 26 also includes a side opening cavity 40 which forms one half of a journaling bore for the worm-type drive gear 28, the other half of the journaling bore being formed by the side opening cavity 42 formed in the other housing portion 24, as best shown in FIG. 4. The cavities 40 and 42 thus form bore halves split along an axially oriented plane P corresponding to the axis of the worm gear 28; the plane P also forms the plane of engagement of the butt-joining walls 41 and 43 of the respective housing portions 24 and 26. The bore or chamber thus formed by the cavities 40 and 42 receive and support therein the drive gear 28. The lower end of each of the cavities 40 and 42, as shown in FIG. 4, has a reduced diameter portion 40a and 42a, respectively, which cooperate to form a thrust-bearing journal for receiving and supporting a shaft end 29 formed on the worm gear 28. As can be seen in FIGS. 3 and 4, the cavity 40 includes an aperture 31 communicating with the bore 32 such that the drive gear 28 can be engaged with the adjusting gear 30.

To assemble the adjusting mechanism 10, the adjusting, spur gear 30 is inserted into the bore 32, after which the drive shaft 52 and worm gear 28 can be laid into the cavity 40 in proper mesh with the adjusting gear 30. Thereafter, the housing portions 24 and 26 are joined by inserting the housing 26 between the spaced opposing walls 44 and 46 extending from the housing portion 24 which engage the housing portion 26 as best shown in FIG. 2. The joining of the housing portions 24 and 26 captures the worm drive gear 28 within the bore halves 40 and 42 and also captures an annular retaining flange 48 formed adjacent the end 50 of a drive shaft 52 which is coupled to the gear 28. The coupled end 50 of the drive shaft 52 has a multi-lobular coupling, preferably in TORX ® configuration, which is received within a mating, multi-lobular coupling recess 54 formed within the upper end of the gear 28. The drive shaft 52 projects from the housing portions 24 and 26 as best shown in FIGS. 1 and 4 to enable turning the drive shaft 52 and coupled drive gear 28 by suitable tooling (not shown) to drive the rotation of the meshed adjusting gear 30 which translates the screw 12. In order to secure the joining of the housing portions 24 and 26, the side wall extensions 44 and 46 from the housing portion 24 are each provided with adjusting screw accommodating apertures 45 and 47, respectively; the apertures 45 and 47 are concentrically aligned with the internally threaded bore 30a of the spur gear 30 as best shown in FIG. 5 and the adjusting screw 12 is passed through apertures 45 and 47 when it is threaded through the gear bore 30a. The disposition of adjusting screw 12 in the internally threaded bore 30a serves to lock the housing portions 24 and 26 in assembly and prevents withdrawal and disjoining of said housing portions 24 and 26. The locking together of the housing portions 24 and 26 and retained meshing of the gears 28 and 30, by the threaded adjusting screw 12 thus eliminates the need for adhesive or other bonding of the housing portions, although mounting fasteners through the fastener aperture 27 in the housing portion 26 and the concentric fastener apertures 25,25 in the extensions 44 and 46 of the housing portion 24 augment retention of the housing portions.

With the adjusting mechanism 10 assembled as described above, it can be appreciated that the application of driving torque to the drive gear 28 will produce rotation thereof. The drive gear 28 is of the worm-gear type and has its gear teeth 28a engaged with the teeth 30b on the spur gear 30. As such, rotation of the drive gear 28 produces rotation of the spur gear 30. It will be recalled that the adjusting screw 12 is engaged in the internally threaded bore 30a of the spur gear, and most importantly the adjusting screw is precluded from rotating in the final assembled position, viz. when affixed to the headlamp. Certain preferred methods of precluding this rotation will be discussed, and other such use of the ears A on the ball end of the adjusting screw 12 are well known in the art. Thus, as the spur gear 30 rotates, there is relative movement between the spur gear 30 and the adjusting screw 12, such that the adjusting screw 12 will move linearly, in accordance with arrow 17, FIG. 1.

When the optional indicator or reset gauge assembly 22 is employed in the mechanism 10 as shown in FIGS. 2, 3 and 5, an integral mounting flange 56 and sighting tube 58 are secured in engagement against the extension wall 46 to which the flange 56 is mounted by means of the concentric mounting apertures 57 and 59 for fasteners (not shown). The bore 60 of the sighting tube 58 is concentrically aligned to allow sliding passage of the adjusting screw 12 therethrough both in joining the housing portions 24 and 26 and in the headlamp adjusting translation of the screw 12. When the indicator or reset gauge assembly 22 is employed, the screw 12 is provided with an unthreaded portion 13 which is provided with an axially arranged series of circumferential indicator lines or graduations 15 that are located to be visible through the sighting slot 62 in the tube 58 when the adjusting screw 12 is within the linear range of translatory movement proximate the correct setting of the headlamp 16 and housing 14. The indicator or reset gauge assembly 22 also includes a split sleeve member 64 which is frictionally slidable and supported on the tube 58. The sleeve member 64 has a cutout or aperture 66 and pointer or indicator 68.

In use of the gauge assembly 22, once the proper setting for a headlamp and correspondingly the adjusting screw 12 has been empirically determined at the factory, the sleeve 64 is moved along the tube 58 so that the pointer 68 is aligned with the Zero-graduation or designation of the indicators 15 which bears a distinguishing indicia such as a "Zero", indicated by reference character 70. Thereafter, any vibrational or other induced displacements of the headlamp and adjusting screw 12 and consequent misalignment of the headlamp housing 14 can be corrected by operation of the mechanism 10. More specifically, the drive shaft 52 and gears 28,30 operated as described above to produce movement of the adjusting screw 12 to bring the Zero indicia 70 on the screw 12 into alignment with the pointer 68 on sleeve member 66 which remains frictionally fixed and stationary on the tube 58 to maintain a record or benchmark for all future adjustments thereof. Once the indicator 68 is aligned with the Zero indicia 70, the headlamp should be re-adjusted to its original position.

Figure 8:
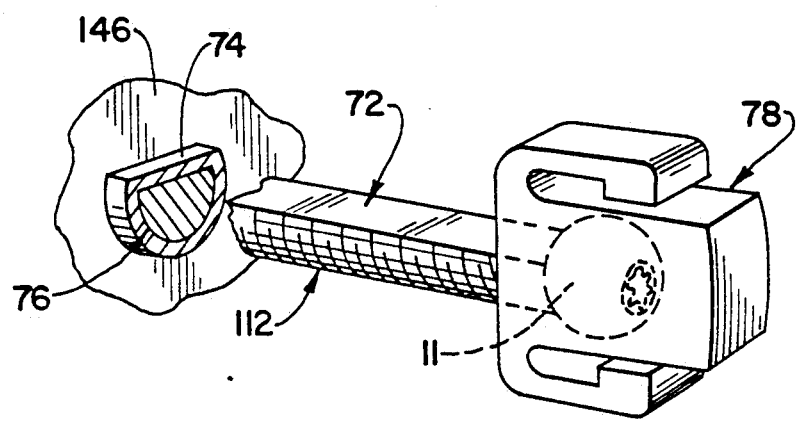
FIG. 8 is a fragmentary perspective view of a device for preventing rotation of an adjusting screw in an adjusting mechanism such as shown in FIG. 1.

Referring now to FIG. 8, alternate means are disclosed for preventing rotation of an adjusting screw, designated 112, so that its motion is limited to linear translation for pivot of the headlamp housing. In this regard, the screw 112 is provided with a peripheral, axially elongate flat portion 72, which is slidably translational against a mating flat 74 formed as part of the housing wall 146; in the illustrated embodiment, the flat 74 extends from the wall 146 as part of a boss 76. The anti-rotational flat portions 72 and 74 provide an alternative to the conventional anti-rotational ears A as shown in FIGS. 1-3, on the ball 11 of the typical ball joint coupling into the headlamp housing 14, as best shown in FIG. 3. In service, the ears A are subject to failure under the stress of resisting induced rotational torque. Thus, when the anti-rotational flats 72 and 74 are employed as shown in FIG. 8, the ears A can be omitted from the ball 11 which forms a simple ball-joint within a plastic socket 78 mounted to the headlamp housing 14.

Figure 7:
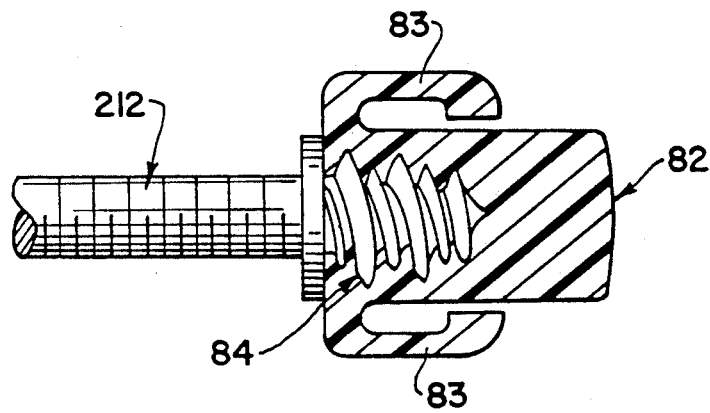
FIG. 7 is a partially sectional view of the coupling device shown in FIG. 6.

Referring now to FIGS. 6 and 7, a second, optional anti-rotational device can be provided in which a longitudinal bore 80 is formed within a plastic socket or bracket member 82, of the type and kind adapted to be engaged with a headlamp frame with a snap fit, and which includes arms 83 for effecting said engagement, of the type to be affixed to the headlamp frame or housing 14. A self-tapping screw portion 84 is provided on the end of the adjusting screw 212. In the illustrated embodiment, the screw end portion 84 has a so-called "high-low" thread configuration as best shown in FIG. 7 which is a well-known expedient for use in engaging a threaded member in a plastic bore. The end portion 84 is engaged in the bore 80 to form an internal thread and a joint with the plastic socket or a socket 82 so that the resulting tapped joint provides sufficient prevailing torque within the joint to resist any tendency of the adjusting screw to rotate when the mechanism 10 is operated. In this regard, it will be noted that the socket 82 to which the adjusting screw is engaged is affixed to a headlamp frame or housing 14 in a manner which precludes rotation thereof. Thus, the frictional engagement between the threaded end portion 84 and bore 80 serves the same purpose as the ears A, FIGS. 1-5, and the engaged flat portions 72 and, 74, FIG. 8.

In light of the foregoing description of the embodied adjusting mechanisms, modifications will be evident of those skilled in the design of such mechanisms and are within the broad scope of the appended claims.

The invention is claimed as follows:

1. An adjusting mechanism for use in the alignment of a headlamp or the like, comprising: housing means; drive gear means and adjusting gear means covered by said housing, said adjusting gear means being operatively engaged with a linearly movable adjusting member and with said drive gear means such that rotation of the drive gear produces linear movement of said adjusting member; said housing means including a first housing portion and a second housing portion, said first housing portion including an internal cylindrical wall and bore therein axially coextensive with and receiving said adjusting gear, said first housing portion and said second housing portion each including a partial cavity which when said portions are assembled form a chamber for the drive gear means, with the partial cavity in said first housing portion including an aperture passing transversely through said cylindrical wall and communicating with said bore for the adjusting gear so that drive gear and said adjusting gear may be engaged, and means for maintaining assembly of said first and second housing portions.

2. An adjusting mechanism according to claim 1 wherein said bore includes an internally projecting annular flange forming a journal within said bore and inserted and axially projecting within a recess formed in an end of said adjusting gear.

3. An adjusting mechanism according to claim 1 wherein one of said housing portions includes a gauge tube through which said adjusting member passes, indicia formed on said adjusting member and movable indicator means provided on said gauge tube, such that said indicator means can be aligned with said indicia on the adjusting member once the proper position of a headlamp is set at the factory to determine a preferred adjustment orientation, whereby once the headlamp becomes out of adjustment said adjusting mechanism can be operated to realign said indicator with said indicia to attain the preferred relative position of the components.

4. An adjusting mechanism for use in alignment of a headlamp or the like, comprising: housing means enclosing an adjusting gear coupled to a translating adjusting member projecting from said housing means for securement to the headlamp, said housing means including an internally projecting annular flange forming a journal member inserted and axially projecting within one end of said adjusting gear, and wherein said housing means includes first and second housing portions, said first housing portion having a bore enclosing said adjusting gear and said second housing portion includes a wall capping said bore opposite said gear end supported on said journal member.

5. An adjusting mechanism according to claim 4 wherein said adjusting member extends through said journal member.

6. An adjusting mechanism for use in alignment of a headlamp or the like, comprising: housing means enclosing an adjusting gear coupled to a translating adjusting member projecting from said housing means for securement to the headlamp, said housing means including an internally projecting annular flange forming a journal member inserted and axially projecting within one end of said adjusting gear, said housing means further including first and second housing portions and said first housing portion is secured between a pair of spaced walls projecting from said second housing portion.

7. An adjusting mechanism according to claim 6 wherein said adjusting member projects through respective aligned apertures formed through both of said spaced walls of said second housing portion.

8. An adjusting mechanism, particularly for alignment of a headlamp, comprising: housing means for enclosing gear means movably coupled to an adjusting member projecting from said housing means such that rotation of said gear means imparts linear movement to said adjusting member for adjusting orientation of said headlamp, and a gauge tube secured to said housing through which said adjusting member translates, said tube having an aperture through which said adjusting member is viewable to determine translational location of a positional indicia carried on said adjusting member, particularly for indicating correct alignment of the headlamp adjusted by said adjusting member.

9. An adjusting mechanism according to claim 8 further comprising indicator means movable upon said gauge tube for recording said correct location of said adjusting member indicia to enable readjustment of the headlamp misalignment.

10. An adjusting mechanism according to claim 9 wherein said indicator means comprises an aperture alignable with said tube aperture to enable viewing said adjusting means indicia through said aligned apertures.

11. An adjusting mechanism according to claim 10 wherein said indicator means further comprises an indicator projection extending into said indicator means aperture for recording alignment therewith of said adjusting member indicia in said correct headlamp alignment.

12. An adjusting mechanism according to claim 10 wherein said indicator means comprises a ring member circumferentially mounted on said tube and axially movable thereon.

13. An adjusting mechanism according to claim 12 wherein said ring is circumferentially mounted in frictionally movable engagement with said tube.

14. An adjusting mechanism according to claim 7 wherein said gauge tube integrally extends from a mounting flange secured to said housing means.

15. An adjusting mechanism of the general type for attaining alignment of a headlamp, where said mechanism includes an adjusting screw, and means for preventing rotation of said adjusting screw moves in a linear path, said means for preventing rotation comprising a screw thread on the end of said adjusting screw which is engageable with a coupling member on a support assembly for the headlamp, such that frictional forces established during said engagement are sufficient to resist rotation of said adjusting screw during normal operating conditions.

16. An adjusting mechanism according to claim 15 further including a socket member having a bore formed therein, said screw thread on the end of said adjusting screw being a self-tapping screw, with said screw thread engaged in said bore.

17. An adjusting mechanism according to claim 16 wherein said socket member is formed of a plastic material and includes means for a snap-fit engagement with a headlamp assembly.

* * * * *

UNITED STATES PATENT AND TRADEMARK OFFICE
CERTIFICATE OF CORRECTION

PATENT NO. : 5,186,531

DATED : February 16, 1993

INVENTOR(S) : Ronald L. Ryder and DAvid C. Goss

It is certified that error appears in the above-identified patent and that said Letters Patent is hereby corrected as shown below:

Column 8 Line 7 " adjusting screw moves" should read -- adjusting screw such that in operation of said mechanism, said adjusting screw moves --

Signed and Sealed this

Fourth Day of January, 1994

Attest:

BRUCE LEHMAN

Attesting Officer

Commissioner of Patents and Trademarks